(12) United States Patent
Wan

(10) Patent No.: US 8,381,442 B2
(45) Date of Patent: Feb. 26, 2013

(54) HAND-PULLING DRIVE MECHANISM FOR AN INDUSTRIAL DOOR

(76) Inventor: Wei Wan, Nanchang (CN)

(*) Notice: Subject to any disclaimer, the term of this patent is extended or adjusted under 35 U.S.C. 154(b) by 651 days.

(21) Appl. No.: 12/541,978

(22) Filed: Aug. 17, 2009

(65) Prior Publication Data

US 2010/0293860 A1 Nov. 25, 2010

(30) Foreign Application Priority Data

May 19, 2009 (CN) .......................... 2009 1 0039584

(51) Int. Cl.
*E05F 15/00* (2006.01)

(52) U.S. Cl. ................ 49/139; 49/140; 49/324; 49/333; 49/334; 49/335; 49/339; 49/340; 160/188; 160/189; 160/310; 74/625

(58) Field of Classification Search ..................... 49/139, 49/140, 132, 333, 334, 335, 339, 340
See application file for complete search history.

(56) References Cited

U.S. PATENT DOCUMENTS

| | | | | |
|---|---|---|---|---|
| 2,053,376 A | * | 9/1936 | Sebire | 74/411 |
| 3,026,744 A | * | 3/1962 | Rouse | 74/625 |
| 3,062,344 A | * | 11/1962 | Kachinskas | 477/199 |
| 3,853,167 A | * | 12/1974 | Wardlaw | 160/133 |
| 4,045,914 A | * | 9/1977 | Catlett | 49/334 |
| 4,860,493 A | * | 8/1989 | Lense | 49/279 |
| 5,036,899 A | * | 8/1991 | Mullet | 160/189 |
| 5,579,878 A | * | 12/1996 | Hsieh | 192/223 |
| 5,708,340 A | * | 1/1998 | Chang | 318/480 |
| 5,839,555 A | * | 11/1998 | Hsieh | 192/223.1 |
| 6,055,885 A | * | 5/2000 | Shea | 74/625 |
| 6,092,582 A | * | 7/2000 | Liu | 160/310 |
| 6,381,903 B1 | * | 5/2002 | Desrochers et al. | 49/139 |
| 6,739,372 B2 | * | 5/2004 | Mullet et al. | 160/189 |
| 6,880,609 B2 | * | 4/2005 | Mullet et al. | 160/188 |
| 7,055,283 B2 | * | 6/2006 | Hsieh | 49/139 |
| 7,185,852 B2 | * | 3/2007 | Kannapell | 244/129.4 |
| 7,275,631 B2 | * | 10/2007 | Hsieh | 192/226 |
| 7,481,133 B2 | * | 1/2009 | Walravens et al. | 74/625 |
| 2005/0144847 A1 | * | 7/2005 | Liles | 49/334 |
| 2005/0172559 A1 | * | 8/2005 | Hsieh | 49/140 |
| 2009/0236921 A1 | * | 9/2009 | Karsch et al. | 310/71 |
| 2010/0132505 A1 | * | 6/2010 | Hsieh | 74/625 |

* cited by examiner

*Primary Examiner* — Katherine W Mitchell
*Assistant Examiner* — Clarence W Mayott, III
(74) *Attorney, Agent, or Firm* — George D. Liu; Ronda IP Agent Co., Ltd.

(57) ABSTRACT

A hand pulling drive mechanism includes a hand drive device and a shaft connected with the hand drive device. The mechanism further includes a gear pair, a rotation propelling device connected with the shaft, and an eccentric pulling device including a shaft pin placed on the shaft and a torsion jacket pivotally connected to the shaft and rotated relative to the shaft pin. The gear pair includes a drive gear sleeved on the shaft for switching, and a follower gear secured to a motor shaft. The rotation propelling device is connected with the drive gear. The torsion jacket and the drive gear pull the torsion jacket through eccentric rotation of the shaft pin when the shaft is rotated, so that the drive gear moves in an axial direction and the follower drive engages with and disengages from the drive gear.

12 Claims, 3 Drawing Sheets

HAND-PULLING DRIVE MECHANISM FOR AN INDUSTRIAL DOOR

BACKGROUND

1. Technical field

The present invention relates to a hand-pulling drive mechanism for an industrial door.

2. Description of related art

In industrial doors, the hand-pulling drive mechanism provides a convenience for users to operate an industrial door. The applicant has long been engaged in research and development work in this technical field and has filed a number of patent applications in Chinese Patent Office. In order to enhance understanding of this technical field, reference is made to series of Chinese patents issued to the applicant.

According to the applicant's understanding, as a result of drawback of the hand-pulling drive mechanism currently used in the current industrial lift door, the connection relationship between lots of components are indirect and complex. During pulling process, the force exerted by hand will be divided into two or more component forces, and the component force used to open the door is less than the originally exerted force. Hence, it takes more force to open the door for users when the users want to open the door. Therefore, this design leads to a limit for a hand-pulling angle and position, reduces the practical value of the product, and brings a lot of inconvenience to the user in operation.

In addition, a conventional structural design of the hand-pulling drive mechanism has some drawbacks, thus leading to inconvenience in assembly, disassembly and maintenance. Even safety thereof is unreliable.

SUMMARY

The purpose of the present invention is to overcome the above-mentioned disadvantages and provides a hand-pulling drive mechanism which is labor-saving, secure, easy to be installed and maintained, and convenient for users to operate the door in any position manually.

To achieve this aim, the invention takes the following technical solutions:

A hand-pulling drive mechanism provided by the invention is used to raise and lower an industrial door and is installed on a motor end casing of a motor. The hand-pulling drive mechanism comprises a hand drive device to be operated manually by user and a shaft fixedly connected with the hand drive device. The hand-pulling drive mechanism further comprises:

a gear pair having an engagement state and a disengagement state, the gear pair comprising a drive gear mounted on the shaft and a follower gear secured to a motor shaft, the both gears cooperatively realizing engagement and disengagement;

a rotation propelling device connected with the shaft to cause the drive gear which is slidably and rotatably coupled with the shaft to rotate;

an eccentric pulling device, comprising a shaft pin radially positioned on the shaft and a torsion jacket pivotally connected to the shaft and rotated relative to the shaft pin, the torsion jacket and the drive gear jointly move to pull the torsion jacket through eccentric rotation of the shaft pin when the shaft is rotated so that the drive gear moves in an axial direction and the follower drive engages with and disengages from the drive gear.

According to an embodiment of the present invention, the drive gear and the follower gear of the gear pair are respectively a bevel gear, and the two bevel gears are directly engaged with each other. In another embodiment, at least one speed changing gear engaged with both the drive gear and the follower gear.

In detail, the rotation propelling device comprises: an feeding tube securely sleeved on the shaft to drive the drive gear moveably connected with the shaft; a torsion spring connected with the feeding tube for driving the shaft to return to an original position when the feeding tube is rotated. And, the feeding tube and the drive gear each have gear teeth provided thereon for engagement with each other.

The eccentric pulling device further comprises an elastic element disposed on one end which is distanced far away from the hand drive device, of the shaft, and the elastic element is pressed against the torsion jacket at the other end which is close to the hand drive device. The elastic element provides a return force for the torsion jacket when the shaft is rotated. And preferably, the elastic element is a cylindrical spring or conical spring.

Further, a pin sliding slot is defined in the torsion jacket, and the shaft pin goes through the pin sliding slot to achieve eccentric rotation and connection. And, the pin sliding slot is triangle in shape.

Considering the length of the shaft and cost factors, a sleeve may be disposed between the torsion jacket and the drive gear for jointly rotating. And, an inner diameter of a bevel tooth portion of the drive gear is greater than an outer diameter of the sleeve, thereby avoiding interference therebetween.

Considering security factors, a hit ring is fixedly secured to the drive gear. When the drive gear is not pulled by the eccentric pulling device, the hit ring is pressed against a protection switch to keep the protection switch being in a normally closed state, thereby ensuring conduction of an electrical power of the motor, and when the drive gear is pulled by the eccentric pulling device, the hit ring will be separated from the protection switch so that the protection switch is in a regular open state to shut down the electrical power of the motor.

In order to save labor, it is desired to make the chain match with the chain wheel directly, while the pulling force is exerted on the shaft directly. The hand drive device comprises a chain and a corresponding chain wheel which is covered by an casing, and a chain guide bush is mounted to the chain for guiding the chain.

Considering the compact structure, the hand-pulling drive mechanism further comprises a lift bracket for supporting the shaft thereon. Further, a stop pin may be integrally formed with the lift bracket or additionally provided on the lift bracket so as to support the torque spring.

In order to constitute an assembly, except for the hand drive device, the overall assembly is enclosed in a cover.

Compared with the existing technology, the present invention has the following advantages:

Firstly, the eccentric pulling device achieves eccentric connection via the shaft pin and the torsion jacket mounted to the shaft. When the chain is pulled, the torsion jacket is able to drive the drive gear to rotate and slide in the axial direction through a series of connection relationships. The torsion jacket can automatically return to an original position via the elastic element. As such, at the same time, in the rotation propelling device, the shaft drives the feeding tube, and the feeding tube matched with the eccentric pulling device drive the drive gear to rotate, and the feeding tube can automatically return to an original position via the torsion spring.

Secondly, the present invention overcomes drawbacks existing in prior art that the chain is pulled by hand necessarily thus causing component force. Rather, in the invention, the pulling force is concentrated on the chain so as to transmit the force to the shaft via the chain wheel, which saves labor of the operator.

Furthermore, the present invention takes full account of safety factors. When the users manually operate, the motor is cut off immediately through the hit ring, thereby preventing a sudden danger and improving the safety factor.

In addition, due to an assembly design, installation and removal of maintenance is easy and convenient. It is of easy maintenance that the hand drive device is separated from other components.

In addition, the users can pull the chain in almost any position as a result of combination of the chain and the chain wheel.

The following drawings and the specific embodiment further explain the present invention.

DETAILED DESCRIPTION OF THE EMBODIMENTS

Figure 1:
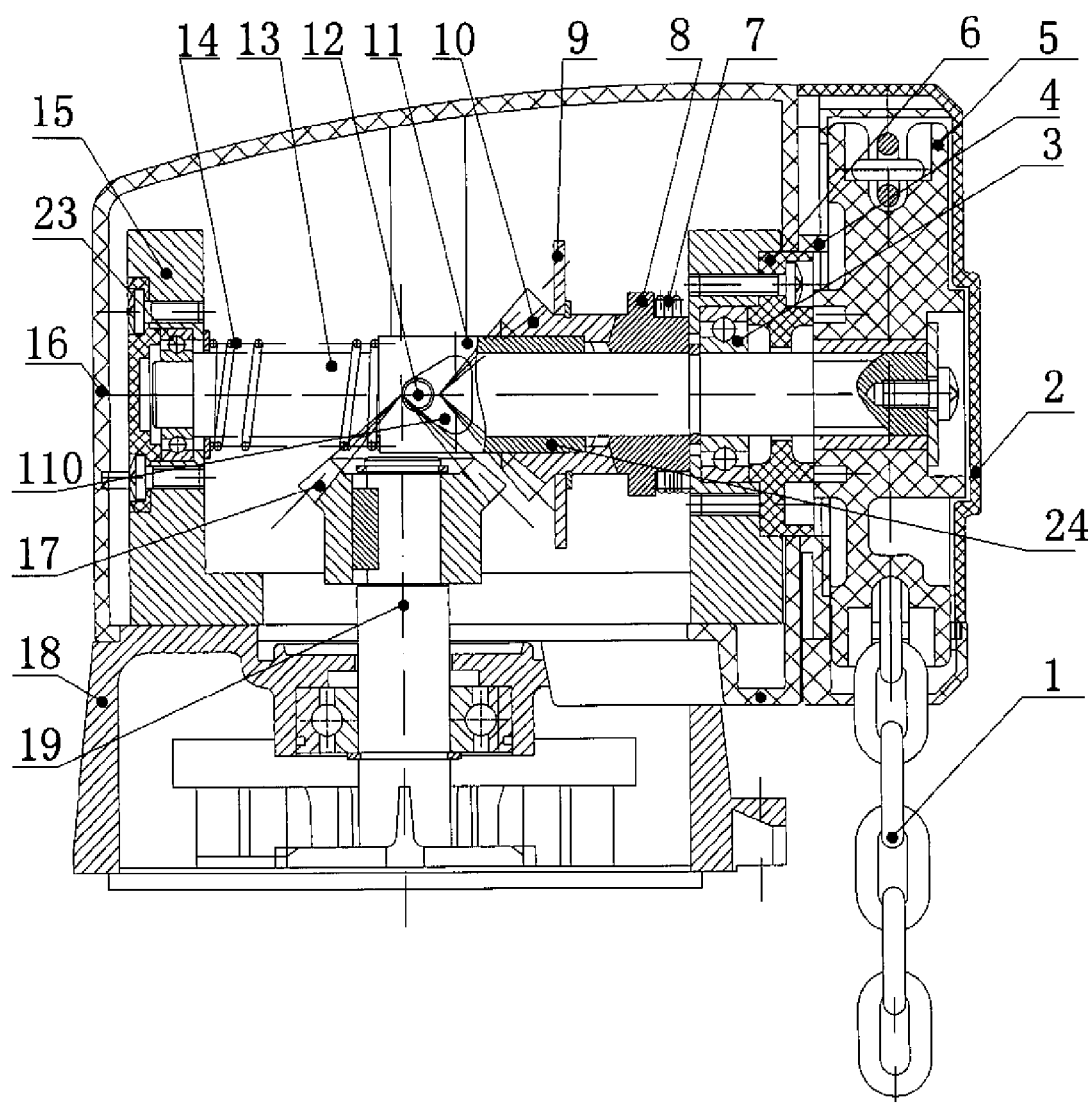
FIG. 1 is a longitudinal cross-sectional view of a hand-pulling drive mechanism for an industrial door according to a preferred embodiment of the present invention.

FIG. 1 illustrates a sectional view of a hand-pulling drive mechanism for an industrial door according to the preferred embodiment of the present invention. Under bottom portion of the mechanism are peripheral components such as a motor shaft 19 and a motor end cover 18 both of which belong to an electric motor used for the industrial door. The hand-pulling drive mechanism of the invention is fixed with the motor end cover 18. The main components of the hand-pulling drive mechanism include a rotation propelling device, an eccentric pulling device, a lift bracket 15, a rotation shaft 13, a gear pair (10, 17) all of which are enclosed by a cover 16. A hand drive device capable of providing manual operation is located at the right side of the mechanism. The hand drive device is encased in a casing 2 and assembled together with the cover 16.

The hand drive device includes a chain wheel 5, a chain 1 and a chain guide bush 4 all of which are enclosed by the casing 2 so as to provide protection thereto, thereby preventing loosening of the chain during pulling process. As known to ordinary person of the art, the casing 2 is designed to be removable and rotatable and can be secured at any desired position. The chain guide bush 4 is suspended on the casing 2 and extends into a wheel slot of the chain wheel 5. In order to avoid jam of the chain 1, the chain I is disposed in the chain guide bush 4 which is located in the wheel slot of the chain wheel 5. Thus, both ends of the chain 1 can be pulled thus resulting rotation of the chain wheel 5 clockwise or counter-clockwise. As a result of the moveable design of the casing 2, the casing 2 can be rotated at any time to expand or change moveable limit of the chain 1, thereby providing more flexible operation.

One end of the shaft 13 passes through a center of the chain wheel 5 and is secured therewith via a screw so as to rotate together with the wheel 5, while the other end of the shaft 13 is rotatably supported on the lift bracket 15. Thus, the exerted force which operates the chain 1 is passed to the shaft 13 through the chain wheel 5. In order to facilitate installation of the gear pair (10, 17), the shaft 13 which is located above an end surface of the motor shaft 19 is vertical to the motor shaft 19. A pivoting end (shown at left side in FIG. 1) of the shaft 13 is pivotably mounted on the lift bracket 15 through a bearing 23, while the other end thereof is pivotably mounted on the lift bracket 15 through another bearing 3. The lift bracket 15 supports the shaft 13, the hand drive device, and so on.

In this embodiment, the gear pair (10, 17) only includes a drive gear 10 and a follower gear 17 engaged with the drive gear 10. The drive gear 10 is moveably sleeved on the shaft 13 to cause axial sliding and rotation of the drive gear 10 with respect to the shaft 13. The follower gear 17 is fixed on an end of the motor shaft 19. Accordingly, when the drive gear 10 slides to a certain position, the drive gear 10 can engage with the follower gear 17. Thus, when the drive gear 10 is forwardly or reversely rotated, the motor shaft 19 can be driven to rotate forwardly or reversely accordingly, thereby leading to movement of the industrial door upward or downward. Clearly, according to the vertical relationship between the motor shaft 13 and the motor shaft 19, it is preferred to have the drive gear 10 and follower gear 17 designed to bevel gears.

Figure 2:
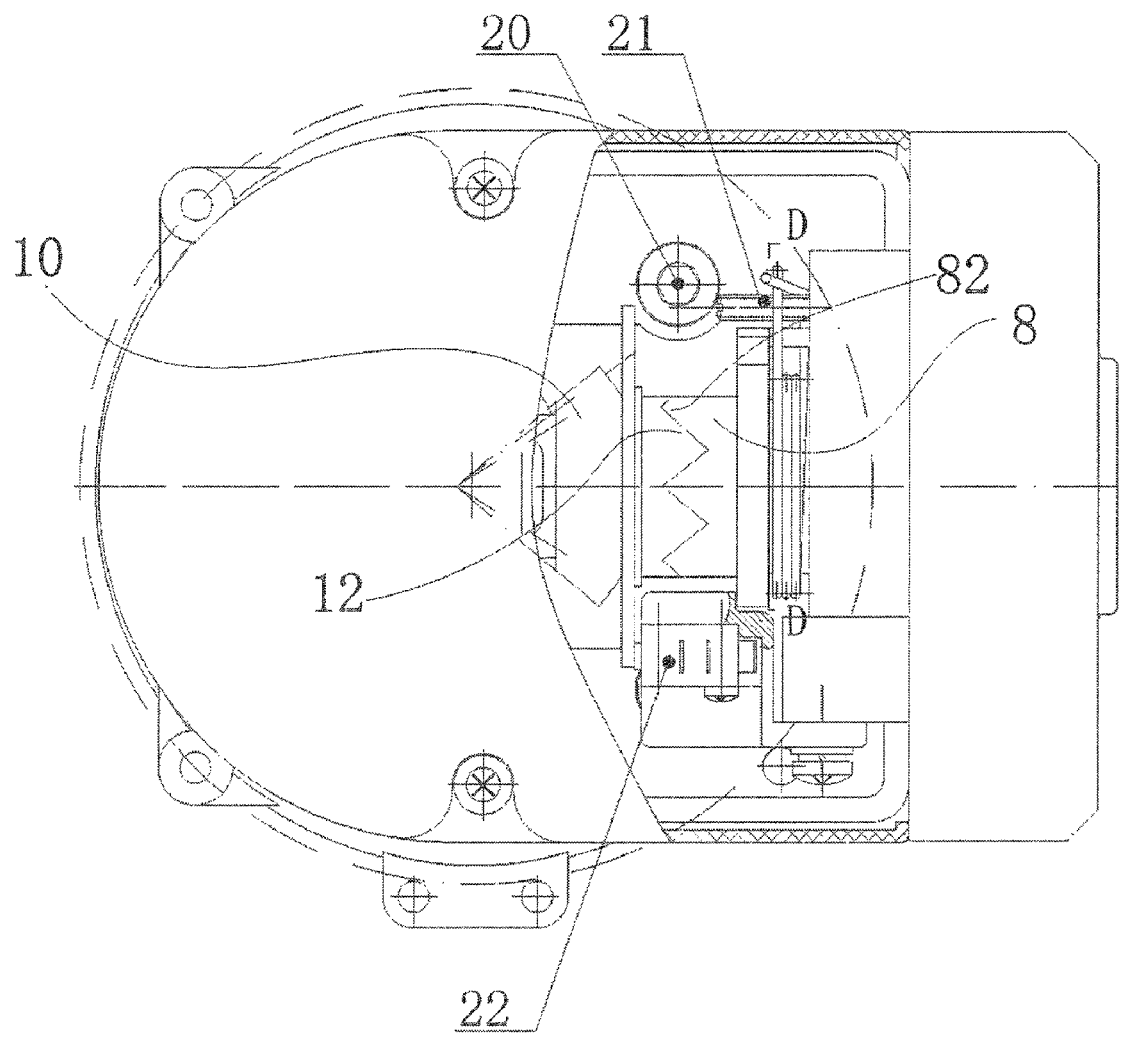
FIG. 2 is a top plan view of the hand-pulling drive mechanism for an industrial door according to the preferred embodiment of the present invention, and some parts located in a top surface are partially removed to show an internal structure more clearly.

Now reference is made to FIG. 2 which shows a top plan view of the mechanism of the invention. In order to prevent occurrence of accident due to suddenly switching on of the motor during manual pulling of the chain 1, a hit ring 9 is fixedly sleeved on the drive gear 10. A protection switch 22 is disposed on the lift bracket 16 of the cover 16 at a location corresponding to the hit ring 9 when the drive gear 10 is not pulled by the torsion jacket 11. When the drive gear 10 is not pulled by the torsion jacket, the hit ring 9 is pressed tightly against the protection switch 22 to keep the protection switch 22 being in a normally closed state, thereby ensuring conduction of an electrical power of the motor. When the drive gear 10 is pulled, because the drive gear 10 slides in an axial direction which in turn causes the hit ring 9 to keep away from the protection switch 22 so that the protection switch 22 is in a normal open state, thereby shutting off the electrical power of the motor. This can prevent occurrence of electrical accident. When the drive gear 10 comes back to its original position, the protection switch 22 is pressed once again such that the motor is switched on again. Once the motor gets electrical power, the motor will be able to work properly.

According to the foregoing description, the gear pair (10, 17) has two states, one of which is the status of engagement for mesh, and the other of which is a non-engagement state. The rotation propelling device and the eccentric pulling device help to perform a switch between these two states.

The eccentric pulling device includes a shaft pin 12, a torsion jacket 11, and an elastic element 14. As shown at left side of FIG. 1, the elastic member 14 is disposed on the pivoting end of the shaft 13, namely one end that is located away from the hand drive device. The elastic element 14 in this embodiment is a cylindrical spring sleeved on the shaft 13. Considering the size of assembly, the cylindrical spring may be replaced by a conical spring. One end of the cylindrical spring is pressed against a wall of the lift bracket 15. Moreover, the shaft pin 12 is radially disposed in an adjacent position of the shaft 13, and the torsion jacket 11 is moveably sleeved on the shaft 13. A side of the torsion jacket 11 resists against the elastic element 14 to connect the elastic element 14. A pin sliding slot 110 is defined in the torsion jacket 11. The pin sliding slot 110 is approximately triangle in shape in the embodiment. The shaft pin 12 rotates around the pin sliding slot 110 eccentrically to engage with the pin sliding slot 110. When the shaft 13 rotates, the torsion jacket 11 follows the shaft 13 to rotate at the same time. The torsion jacket 11 is limited to move by the shaft pin 12. The shaft pin 12 also rotates around the shaft 13 at the same time, and slides to compress the elastic element 14. Thus, the elastic potential energy of the elastic element 14 is also gradually increased. When the elastic potential energy accumulates to a certain extent, the release force is exerted on the torsion jacket 11 to thereby help the torsion jacket 11 and the shaft 13 to come back to an original position.

The eccentric pulling device is mainly used to pull the drive gear 10. In the embodiment, a sleeve 24, disposed around the shaft 13, is connected with an end of the torsion jacket 11 away from the elastic element 14. The sleeve 24 is fixedly connected with the drive gear 10, and an inner diameter of a bevel tooth portion of the drive gear 10 is greater than an outer diameter of the sleeve 24 so that the sleeve 24 will not interfere with the engagement between the drive gear 10 and the follower gear 17. By means of traction of the torsion jacket 11, the sleeve 24 together with the drive gear 10 rotates and slides such that the drive gear 10 is in engagement with the follower gear 17. The follower gear 17 rotates to lift or fall the industrial door. At the same time, the torsion sleeve 11, sleeve 24 and the drive gear 10 return to the original position as a result of resiliency of the elastic element 14. Thus, the drive gear 10 disengages from the follower gear 17.

It needs to be noted that gear teeth of the drive gear 10 is prone to touching gear teeth of the follower gear 17 during meshing process. However, since the shaft pin 12 can moveably rotate in the pin sliding slot 110 of the torsion jacket 11, when gear teeth of the drive gear 10 touch gear teeth of the follower gear 17 during the course of meshing, the follower gear 17 can be in precise engagement with the drive gear 10.

It can be seen that the eccentric pulling device is focused on providing force in an axial direction of the shaft 13, while the rotation propelling device is focused on providing force in a circumferential direction of the shaft 13.

Figure 3:
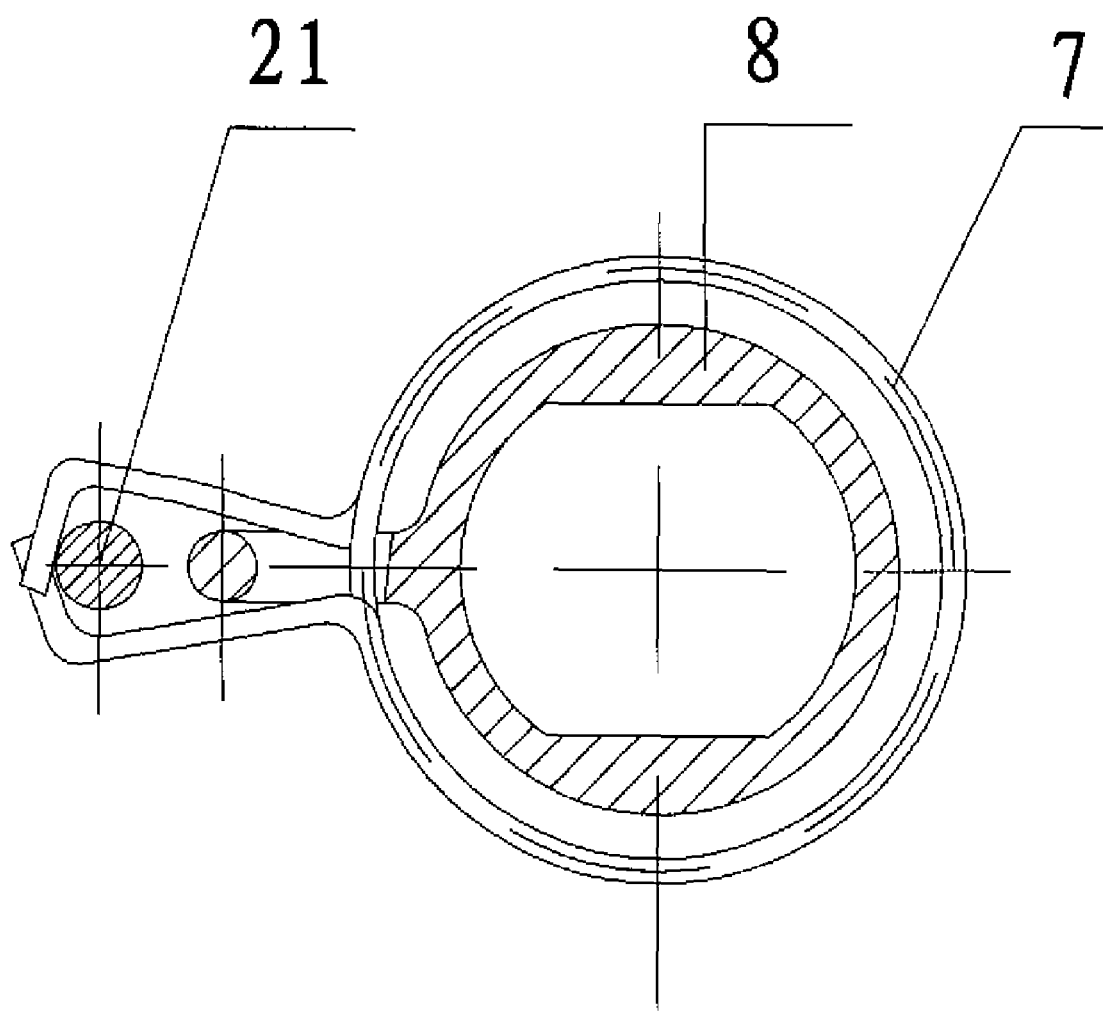
FIG. 3 is a cross-sectional view of FIG. 2, taken along line D-D.

The rotation propelling device includes a feeding tube 8 and a torque spring 7. With reference to FIG. 3, the feeding tube 8 is hollow and fixedly sleeved on the shaft 13 to not cause the feeding tube 8 to rotate relative to the shaft 13. An end of the feeding tube 8 is defined as a thin portion for receiving the torque spring 7 therein, whereas the other end thereof is defined as a thick portion and its end surface is designed to have teeth formed thereon. An end surface of the drive gear 10 and feeding tube 8 are both designed to have teeth formed thereon respectively. Specifically, as shown in FIG. 2, one end surface of the drive ear 10 is formed with a first toothed portion 12 whereas one end surface of the feeding tube 8 is defined with a second toothed portion 82 engaged with the first toothed portion 12. Thus, the drive gear 10 matches with the feeding tube 8 via respective toothed portions 12 and 82 to achieve a moveable connection therebetween, hence the drive gear 10 being able to rotate together with the feeding tube 8 when engaged each other and not rotate together when disengaged. As shown in FIG. 3, the torsion spring 7 has a cylindrical helix portion and two protruding ends that bent in reverse direction. The cylindrical helix portion is disposed around the thin portion of the feeding tube 8, and the cylindrical helix portion is positioned between the thick portion of the feeding tube 8 and a wall of the lift bracket 15. Two protruding ends of the torsion spring 7 are both hooked on a stop pin 21 which is secured on the lift bracket 15 (shown in FIGS. 2, 3). When the feeding tube 8 along with the shaft 13 rotates forwardly or reversely, the torsion spring 7 can accumulate elastic potential energy through one of the protruding ends. When elastic potential energy is accumulated to a certain degree, the torsion spring 7 is able to provide a restoration spring force to the feeding tube 8, to thereby urge the feeding tube 8 to drive the shaft 13 to return to the original position. The feeding tube 8 are driven to rotate by the shaft 13 when the user is in active operation of the chain 1 and at the beginning, the feeding tube 8 follows the shaft 13 to rotate together. The teeth portion of the feeding tube 8 drives the drive gear 10 to rotate. Thus, the rotation propelling device may drive the drive gear 10 to rotate at the same time.

It can be seen from the above that the eccentric pulling device and the rotation propelling device are both driven by the shaft 13. When the shaft 13 is rotated initially, the rotation propelling device drives the drive gear 10 to rotate by the feeding tube 8. Simultaneously, the eccentric pulling device drives the drive gear 10 to rotate, and the eccentric pulling device is ready to cause the drive gear 10 to slide in the axial direction. When the shaft 13 continues to rotate, the drive gear 10 is pulled by the eccentric pulling device, thus being separated from the feeding tube 8. The drive gear 10 continues to slide in the axial direction, and then engages with the follower gear. When the eccentric pulling device continues to rotate, the drive gear 10 drives the follower gear 17 to move at least one pitch of teeth, thereby causing the motor shaft 19 to rotate a small angle. Thus, the industrial door may be lifted or landed (based on the rotation direction of the chain wheel 5). Furthermore, the compressed elastic element 14 and the twisted torsion spring 7 release elastic potential energy. That is, the torsion jacket 11, the sleeve 24 and the drive gear 10 jointly move in the axial direction and rotate to the original position. Simultaneously, the shaft 13 is driven to rotate to the original position. Thus, an operation cycle is finished. As long as the operators continue to pull the chain 1, it will be able to continue to repeat this cycle, so as to continuously lift or land industrial doors.

In another embodiment of the present invention, the gear pair (10, 17) may include a number of speed changing gears, namely, at least one speed changing gear is disposed between the drive gear 10 and the follower gear 17. The drive gear 10 and follower gear 17 is not confined to the bevel gear. The drive gear 10 and follower gear 17 may be other gears known by ordinary person of the art.

Regarding to the lift bracket 15, the lift bracket 15 is flexibly designed according to a specific space in the cover 16, and the stop pin 21 may be formed with the lift bracket 15 integrally.

The pin sliding slot 110 of the torsion jacket 11 of the eccentric pulling device is also not limited to the aforementioned triangle shape. Indeed, they can be of other shapes such as oval, polygon and so on, and the specific shape of the pin sliding slot 110 can be designed according to the axial distance of run and rotation angel of the drive gear 10, as long as release of the torsion spring 7 approximately keep pace with release of the pin sliding slot 110.

The torsion jacket 11, the sleeve 24 or the drive gear 10 may be integrally molded, and ordinary person of the art knows this replacement principle.

In addition, some of the machinery assembly is public to know by person of ordinary in the art, and should be covered by the spirit of the present invention. For example, bearing caps 6 may be disposed on an outside of the bearings 3, 23 to protect the bearings 3, 23. The lift bracket 15 is secured to other components using locking screws 20 in order to ensure the stability of the structure.

To sum up, due to an ingenious design, the hand-pulling mechanism for industrial doors forms an assembly. It can be easily mounted to the drive motor shaft 19, thereby causing convenient installation and maintenance. The hand driving device is employed to facilitate users pulling the chain 1 at any position, thereby saving labor for users. The hit ring 9 is combined with the protection switch 22 to further protect the overall mechanism. So, the present invention is different from the public technology, and has the characteristics of technological novelty and innovation.

What is claimed is:

1. A hand-pulling drive mechanism for an industrial door, the mechanism being installed on a motor end cover of a motor used to move the industrial door upward or downward, comprising a hand drive device for users to manually operate the mechanism and a shaft connected with the hand drive device, the hand pulling drive mechanism further comprising:

a gear pair having an engagement state and a disengagement state, comprising a drive gear sleeved on the shaft to switch between the two states, and a follower gear secured to a motor shaft;

a rotation propelling device connected with the shaft to cause rotation of the drive gear, the rotation propelling device being moveably connected with the drive gear;

an eccentric pulling device comprising a shaft pin radially positioned on the shaft and a torsion jacket pivotally connected to the shaft and capable of rotation relative to the shaft pin, wherein the torsion jacket and the drive gear rotate together such that rotation of the shaft pin relative to the torsion jacket causes axial movement of the torsion jacket and the drive gear during rotation of the shaft, thereby leading to engagement and disengagement between the drive gear and the follower gear; wherein, the rotation propelling device comprising:

a feeding tube fixedly connected to the shaft so that rotation of the shaft causes the drive gear to move axially relative to the shaft and rotate with the feeding tube;

a torsion spring engaged with the feeding tube urging the feeding tube and the shaft to return to an original position when the feeding tube is rotated from said original position;

one end surface of the drive gear includes a first toothed portion whose teeth project parallel to a longitudinal axis of the drive gear, whereas one end surface of the feeding tube includes a second toothed portion engaged with the first toothed portion.

2. The hand-pulling drive mechanism for an industrial door according to claim 1, wherein the drive gear and the follower gear of the gear pair are bevel gears and the two bevel gears are directly engageable with each other.

3. The hand-pulling drive mechanism for an industrial door according to claim 1, wherein the eccentric pulling device further comprising an elastic element disposed on a distal end of the shaft, and the elastic element is pressed against the torsion jacket and the elastic element provides a return force to the torsion jacket when the shaft is rotated.

4. The hand-pulling drive mechanism for an industrial door according to claim 3, wherein the elastic element is a cylindrical spring or conical spring.

5. The hand-pulling drive mechanism for an industrial door according to claim 1, wherein a pin sliding slot is defined in the torsion jacket of the eccentric pulling device, and the shaft pin extends through the pin sliding slot.

6. The hand-pulling drive mechanism for an industrial door according to claim 5, wherein the pin sliding slot is triangularly shaped.

7. The hand-pulling drive mechanism for an industrial door according to claim 1, wherein a sleeve is disposed between the torsion jacket and the drive gear.

8. The hand-pulling drive mechanism for an industrial door according to claim 7, wherein an inner diameter of a bevel tooth portion on the other end surface of the drive gear is greater than an outer diameter of the sleeve.

9. The hand-pulling drive mechanism for an industrial door according to claim 8, wherein a hit ring is fixedly secured to the drive gear so that when the drive gear is not pulled by the eccentric pulling device, the hit ring is pressed against a protection switch to keep the protection switch in a normally closed state, thereby ensuring conduction of electrical power to a motor, and when the drive gear is pulled by the eccentric pulling device, the hit ring disengages from the protection switch so that the protection switch is in a regular open state to disconnect the electrical power to the motor.

10. The hand-pulling drive mechanism for an industrial door according to claim 9, wherein the hand drive device comprises a chain and a corresponding chain wheel, the chain wheel being covered by a casing, and a chain guide bush being mounted to the casing for guiding the chain.

11. The hand-pulling drive mechanism for an industrial door according to claim 10, further comprising a lift bracket for supporting the shaft.

12. The hand-pulling drive mechanism for an industrial door according to claim 10, further comprising a lift bracket, and the lift bracket has a stop pin for supporting the torsion spring.

* * * * *